(12) United States Patent
Gregory

(10) Patent No.: US 6,729,187 B1
(45) Date of Patent: May 4, 2004

(54) SELF-COMPENSATED CERAMIC STRAIN GAGE FOR USE AT HIGH TEMPERATURES

(75) Inventor: Otto J. Gregory, Wakefield, RI (US)

(73) Assignee: The Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 0 days.

(21) Appl. No.: 09/958,643
(22) PCT Filed: Apr. 27, 2000
(86) PCT No.: PCT/US00/11334
§ 371 (c)(1),
(2), (4) Date: Jun. 17, 2002
(87) PCT Pub. No.: WO02/35178
PCT Pub. Date: May 2, 2002

Related U.S. Application Data
(60) Provisional application No. 60/131,584, filed on Apr. 29, 1999.

(51) Int. Cl.$^7$ .................................................. G01N 3/00
(52) U.S. Cl. ............................ 73/760; 73/763; 73/765; 73/777; 73/204.26; 73/204.27
(58) Field of Search ...................... 73/760, 763, 765, 73/766, 776, 777

(56) References Cited

U.S. PATENT DOCUMENTS

| 3,609,625 | A | * | 9/1971 | Watanabe et al. ............... 338/3 |
| 3,805,601 | A | * | 4/1974 | Jeffers ........................... 73/777 |
| 4,217,785 | A | | 8/1980 | Spoor |
| 4,299,130 | A | | 11/1981 | Koneval |
| 4,325,048 | A | | 4/1982 | Zaghi et al. |
| 4,432,247 | A | | 2/1984 | Takeno et al. |
| 4,576,052 | A | | 3/1986 | Sugiyama |
| 4,958,526 | A | * | 9/1990 | Haggstrom ............ 73/862.622 |
| 4,986,131 | A | * | 1/1991 | Sugiyama et al. ............. 73/766 |
| 5,375,474 | A | | 12/1994 | Moore, Sr. |
| 5,926,778 | A | | 7/1999 | Poppel |

FOREIGN PATENT DOCUMENTS

CN 2284949 Y 6/1998

* cited by examiner

Primary Examiner—Edward Lefkowitz
Assistant Examiner—Alandra Ellington
(74) Attorney, Agent, or Firm—Gauthier and Connors

(57) ABSTRACT

A self-compensated strain gage sensor having a temperature co-efficient of resistance (TCR) of essentially zero comprised of a wide band semiconductor and a compensating metal functioning as serial resistors. Based on the resistivity of the semiconductor and the metal and the temperature range in which the sensor will operate the dimensions of the semiconductor and the metal are determined to provide a zero TCR.

6 Claims, 2 Drawing Sheets

US 6,729,187 B1

SELF-COMPENSATED CERAMIC STRAIN GAGE FOR USE AT HIGH TEMPERATURES

This application claims the benefit of Provisional application Ser. No. 60/131,584, filed Apr. 29, 1999.

BACKGROUND OF THE INVENTION

1. Field of the Invention

The invention relates to thin film strain gages.

2. Description of the Relevant Art

The accurate measurement of both static and dynamic strain, at elevated temperatures is frequently required to determine the instabilities and life-times of various structural systems, and in particular, advanced aerospace propulsion systems. Conventional strain gages are typically applied to both stationary and rotating components for this purpose but are usually limited in scope due to their intrusive nature, severe temperature limitations and difficulties in bonding.

Thin film strain sensors are particularly attractive in the gas turbine engine environment since they do not adversely effect the gas flow over the surface of a component and do not require adhesive or cements for bonding purposes. Typically, thin film strain gages are deposited directly onto the surface of a component by rf sputtering on other known thin film deposition technology and as a result are in direct communication with the surface being deformed. In general, the piezo-resistive response or gage factor (g), of a strain gage is the finite resistance change of the sensing element when subjected to a strain and can result from (a) changes in dimension of the active strain element and/or (b) changes in the resistivity ($\rho$) of the active strain element. Further, the active strain elements used in a high temperature static strain gage, must exhibit a relatively low temperature co-efficient of resistance (TCR) and drift rate (DR) so that the thermally induced apparent strain is negligible compared to the actual mechanical applied strain.

One material of choice for high temperature thin film strain gages is a wide band semiconductor, e.g. indium-tin oxide (ITO), due to its excellent electrical and chemical stability and its relatively large gage factor at high temperature. When used alone it is usually limited by relatively high TCRs as is the case for many intrinsic semiconductors. However, as disclosed herein the TCR of a self-compensated ITO strain sensor can be reduced using a metal, e.g. Pt as a thin film resistor placed in series with the active ITO strain element.

However, the proper combination of materials, patterns and dimensions to fabricate a strain gage with a predetermined TCR is mostly a matter of empirical observation, i.e. trial and error.

With the present invention, knowing the temperature range that the sensor is to be operative at and the resistivities of the materials each at a working and a reference temperature one can automatically determine the TCR of a high temperature strain gage.

Broadly the invention comprises a self-compensated strain gage sensor having an automatically determined TCR including a TCR of essentially zero. The sensor comprises a wide band semiconductor deposited on a substrate. A metal is deposited on the substrate and in electrical communication with the semi-conductor functioning as serial resistors, the length, width and thicknesses of the semi-conductor and the metal are selected based on their resistivities at selected working and reference temperatures and the TCR automatically determined.

The semiconductors can be selected from the group consisting of silicon carbide, aluminum nitride, zinc oxide, gallium nitride, indium nitride, scandium nitride, titanium nitride, chromium nitride, zirconium nitirde, boron carbide, diamond, titanium carbide, tantalum carbide, zirconium carbide, gallium phosphide, aluminum gallium nitride, zinc oxide doped with alumina, cadmium telleride, cadmium selenide, cadmium sulfide, mercury cadmium telleride, zinc selenide, zinc telleride, magnesium telleride, tin oxide, indium oxide, manganates-manganese oxides with iron oxides, iron oxide-zinc-chromium oxide, iron oxide-magnesium-chromium oxide, ruthenium oxide, lithium doped nickel oxide, tantalum nitride, indium-tin oxide-gallium oxide-tin oxide and combinations thereof.

The metal resistors can be selected from the group consisting of platinum, rhodium, palladium, gold, chromium, rhenium, irridium, tungsten, molybdenum, nickel, cobalt, aluminum, copper, tantalum, alloys of platinum and rhodium and combinations thereof.

A particularly preferred semi-conductor is indium tin oxide and a particularly preferred metal is platinum.

DESCRIPTION OF THE PREFERRED EMBODIMENT(S)

Discussion

Figure 1:
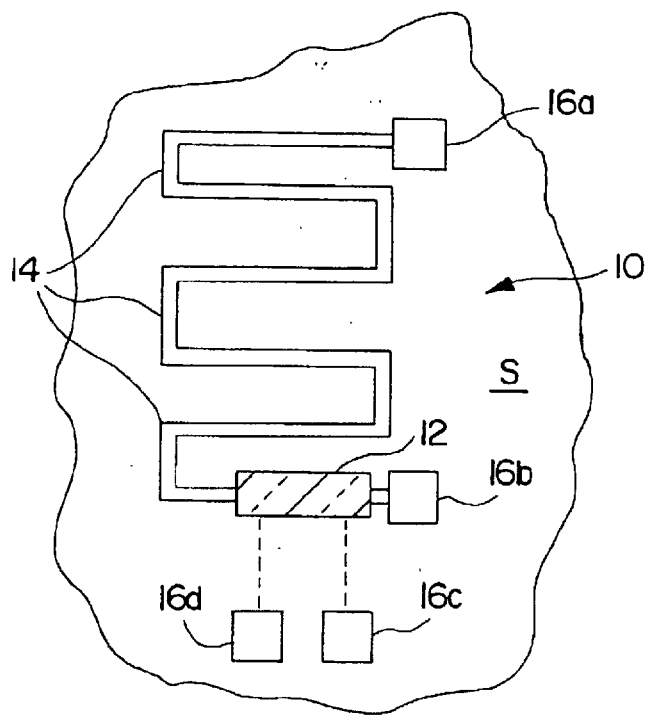
FIG. 1 is an illustration of a sensor design.

To establish adequate design rules for the self-compensated strain gage, the TCR of a self-compensated strain sensor is first modeled. The following approach is used to model the TCR of an ITO sensor with Pt self-compensation circuitry:

$$TCR_{COMP} = (R_{COMP,f} - R_{COMP,0})/(R_{COMP,0} * \Delta T) \quad (1)$$

Where $R_{COMP,f}$ is compensated sensor resistance at a specific temperature, $R_{COMP,0}$ is compensated sensor resistance at a reference temperature, $\Delta T$ is the temperature difference, and $$R_{COMP,f} = R_{Pt,f} + R_{ITO,f} \quad (2)$$

$$R_{COMP,0} = R_{Pt,0} + R_{ITO,0} \quad (3)$$

Substituting equation (2) and (3) into equation (1), $TCR_{COMP}$, results in $$TCR_{COMP} = ((R_{Pt,f} + R_{ITO,f}) - (R_{Pt,0} + R_{ITO,0}))/((R_{Pt,0} + R_{ITO,0}) * \Delta T) \quad (4)$$

The resistance R is related to resistivity ($\rho$) which is a constant at a specific temperature, $$R = \rho * L/(w * t) \quad (5)$$

Where L, w and t are length, width and thickness of sensor film. Substituting R into equation (4) $TCR_{COMP}$, results in a final format equation to model $TCR_{COMP}$.

$$TCR_{COMP} = (\Delta \rho_{Pt} * A_{Pt} + \Delta \rho_{ITO} * A_{ITO})/((\rho_{Pt,0} * A_{Pt} + \rho_{ITO,0} * A_{ITO}) * \Delta T) \quad (6)$$

Where $$\Delta \rho_{Pt} = \rho_{Pt,f} - \rho_{Pt,0} \quad (7)$$

$$\Delta \rho_{ITO} = \rho_{ITO,f} - \rho_{ITO,0} \quad (8)$$

$$A_{Pt} = L_{Pt}/(w_{Pt} * t_{Pt}) \quad (9)$$

$$A_{ITO} = L_{ITO}/(w_{ITO} * t_{ITO}) \quad (10)$$

$\rho_{Pt,f}$, $\rho_{Pt,0}$, $\rho_{ITO,f}$, $\rho_{ITO,0}$ are resistivities of Pt and ITO at a working and reference temperatures. In equation (6), all resistivities and $\Delta T$ are constants, $\Delta \rho_{Pt} > 0$ and $\Delta \rho_{ITO} < 0$, a different length (L), width (w) and thickness (t) of ITO and Pt can be designed to let the TCR of self-compensated ITO-Pt sensor film be zero.

Also from equation (4), the TCR of self-compensated sensor can be related to TCR of Pt and ITO.

$$TCR_{COMP} = ((R_{Pt,f} + R_{ITO,f}) - (R_{Pt,0} + R_{ITO,0}))/((R_{Pt,0} + R_{ITO,0}) * \Delta T) \quad (4)$$

$$TCR_{COMP} = \{[(R_{Pt,f} - R_{Pt,0})/(R_{Pt,0} * R_{ITO,0} * \Delta T)] + [(R_{ITO,f} - R_{ITO,0})/(R_{Pt,0} * R_{ITO,0} * \Delta T)]\} * B$$

Where $$B = (R_{Pt,0} * R_{ITO,0})/(R_{Pt,0} + R_{ITO,0})$$

simplify this equation, the TCR of self-compensated sensor related to constant TCR of Pt and ITO.

$$TCR_{COMP} = (TCR_{Pt} * R_{Pt,0} + TCR_{ITO} * R_{ITO,0})/(R_{Pt,0} + R_{ITO,0}) \quad (11)$$

The mathematical expressions set forth above were solved using commercially available software such as Mat Lab or Math Cad software loaded into a personal computer.

Sensor Preparation

A self-compensated ITO sensor was fabricated by sputtering Pt and ITO films that were subsequently patterned. A sensor design embodying the invention is shown in FIG. 1. A sensor is shown generally at 10 comprises a wide band semiconductor e.g. ITO, 12 and a metal, e.g. Pt, compensation circuit 14, deposited on a substrate S. For purposes of generating experimental data, there are four Pt bond pads 16a, 16b, 16c and 16c.

Figure 2:
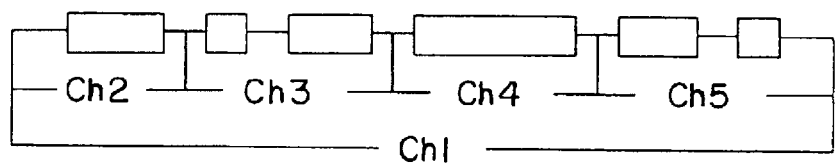
FIG. 2 is a simulated circuit of the design of FIG. 1.

This self-compensated sensor 10 can be simulated as a circuit composed of resistors as shown in FIG. 2. Ch1 can measure the resistance of whole sensor, Ch2 is used to measure resistance of the Pt, Ch4 is for ITO part, Ch3 and Ch5 are for contact resistance between Pt and ITO.

Indium tin oxide (ITO) films were developed by rf reactive sputtering at low temperature using an MRC model 822 sputtering system. A high density target (12.7 cm in diameter) with a nominal composition of 90 wt % $In_2O_3$ and 10 wt % $SnO_2$ was used for all depositions. Oxygen partial pressure was 30% while an rf power density of 2.4 W/cm$^2$ and a total pressure of 9 mtorr was maintained during each sputtering run. Aluminum oxide constant strain beams were cut from rectangular plates (Coors Ceramics—99.9% pure) using a laser cutting technique. The constant strain beams were then sputter-coated with 4 $\mu$m of high purity alumina prior to the deposition of the ITO strain gages. After spin casing 4 $\mu$m of ITO, a 2 $\mu$m thick layer of positive photoresist was spin-coated onto the ITO film coating. After exposure and development, the ITO films were etched in concentrated hydrochloric acid to delineate the final device structure. Sputtered platinum films (1.1 $\mu$m thick) were used to form ohmic contacts to the active ITO strain elements.

The dimensions set forth above for the sensors were for experimental purposes to prove the concept and the mathematical model. One skilled in the art will recognize that the dimensions of a commercially viable sensor according to the teachings of the invention can be made at least an order of magnitude smaller using the current state-of-the-art microelectronic fabrication techniques.

Figure 3:
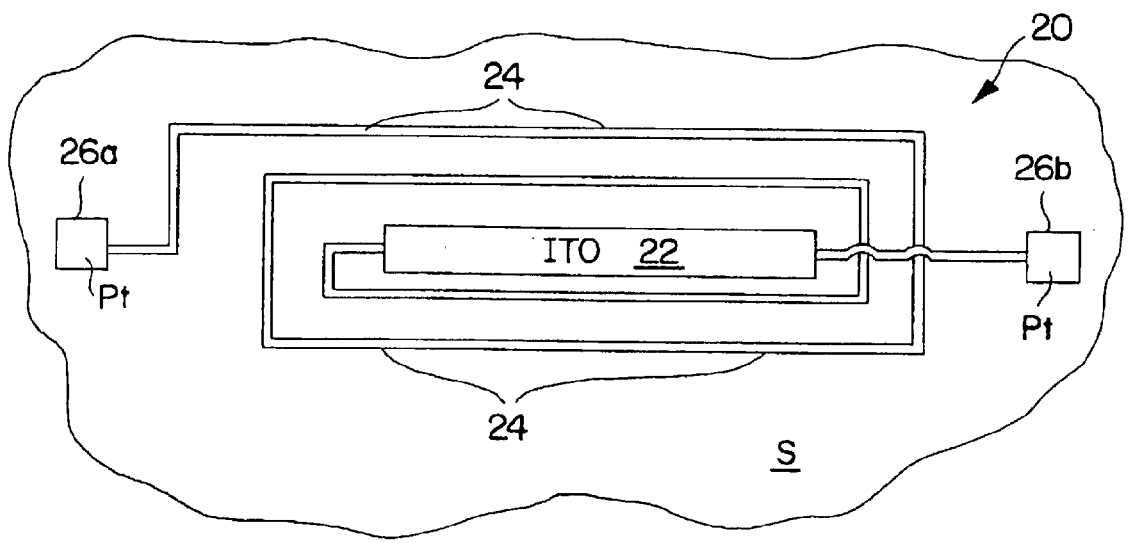
FIG. 3 is an illustration of an alternative sensor design.

Referring to FIG. 3, a sensor 20 is shown and comprises a wide band semiconductor 22 and a metal compensating circuit 24 on a substrate S. In this design, the G(−) of the semiconductor is maximized and the G(+) of the metal is minimized. Also shown are metal bond pads 26a and 26b. When the sensor is read, a monitor (not shown) connects to the bond pads 26.

High Temperature Strain Rig

Strain measurements were made using a cantilever bending fixture fabricated out of a machinable zirconium phosphate ceramic. A solid alumina rod was connected between an alumina constant strain beam and a linear variable differential transducer (LVDT) to measure deflection of the strain beam. Corresponding resistance changes were monitored using a four wire method with a 6 and ½ digit Hewlett Packard multimeter and a Keithley constant current source. The high accuracy LVDT, multimeter and constant current source were interfaced to an I/O board and an IBM PC employing an IEEE 488 interface. Lab Windows software was used for data acquisition.

High Temperature Strain Test Results

To evaluate the piezoresistive properties of the active ITO strain gage used over a wide temperature range, it is important to characterize the variation in electrical response with temperature. The electrical response of an ITO fim grown in a 30% $O_2$ plasma as disclosed above and thermally cycled in air at temperatures up to 1200° C. was observed.

Broad band semiconductors over a defined temperature range may exhibit a single TCR or two or more TCRs. It will be understood that if two linear TCRs are exhibited in two distinct temperature ranges within the defmed temperature range that a sensor will be fabricated based on each distinct temperature range in order that the strain can be measured over the defmed temperature range.

It is known for ITO films that there can be two distinct TCRs depending upon temperature. T>800°, a linear response with a TCR of −210 ppm/° C. has been observed and that T>800° C., a TCR of −2170 ppm/° C. has been observed. More recently, an ITO with a single TCR of −300 to −1,500 ppm° C. has been measured.

EXAMPLE

In the example, a four-wire method was used connecting to the bond pads 16. This method is well known to one skilled in the art. The sensor was fabricated and tested as outlined in the sections above. Four cycles of heating and cooling were measured, the results are shown below and in FIG. 4. After the first heating, the resistance changing with temperature is almost identical in four cycles, thus it shows the reproducibility is good.

TABLE 1

| Temperature (° C.) | Resistance of Ch1 (Ω) | Resistance of Ch2 (Ω) | Resistance of Ch3 (Ω) | Resistance of Ch4 (Ω) | Resistance of Ch5 (Ω) |
| --- | --- | --- | --- | --- | --- |
| 1200 | 437 | 379 | 5 | 40 | 12 |
| 30 | 442 | 160 | 26 | 225 | 31 |

$TCR_{COMP}=(R_{COMP,f}-R_{COMP,0})/(R_{COMP,0}*\Delta T)=(437-442/(437*1170)=-9.8(ppm/° C.)$ $TCR_{Pt}=(R_{Pt,f}-R_{Pt,0})/(R_{Pt,0}*\Delta T)=(379-160)/(160*1170)=+1169(ppm/° C.)$ $TCR_{ITO}=(R_{ITO,f}-R_{ITO,0})/(R_{ITO,0}*\Delta T)=(40-225)/(225*1170)=-702(ppm/° C.)$ Resistivity of Pt
At 30° C., $\rho_{Pt,0}=R_{Pt,0}*(w*t)/L=160*(0.6\ mm*0.8\times10^{-3})/500=1.535\times10^{-4}(\Omega*m)$ At 1200° C., $\rho_{Pt,f}=R_{Pt,f}*(w*t)/L=379*(0.6*0.8\times10^{-3})/500=3.639\times10^{-4}(\Omega*m)$ Resistivity of ITO
At 30° C., $\rho_{ITO,0}=R_{ITO,0}*(w*t)/L=225*(5*4.4\times10^{-3})/60=8.25\times10^{-2}(\Omega*m)$ At 1200° C., $\rho_{ITO,f}=R_{ITO,f}*(w*t)/L=40*(5*4.4\times10^{-3})/60=1.498\times10^{-2}(\Omega*m)$ from eq.(6)

$TCR_{COMP}=(\Delta\rho_{Pt}* A_{Pt}+\Delta\rho_{ITO}*A_{ITO})/((\rho_{Pt,0}*A_{Pt}+\rho ITO,0*A_{ITO})*\Delta T)$ (6)

Where $\Delta\rho_{Pt}=\rho_{Pt,f}-\rho_{Pt,0}=*(3.639-1.535)*10^{-4}(\Omega*mm)$ $\Delta\rho_{ITO}=\rho_{ITO,f}-\rho_{ITO,0}=*(1.498-8.25)*10^{-2}(\Omega*mm)$ $A_{Pt}=L_{Pt}/(w_{Pt}*t_{Pt})=500/(0.6*0.8\times10^{-3})(mm^{-1})$ $A_{ITO}=L_{ITO}/(w_{ITO}*t_{ITO})=75/(5\ mm*4.4\times10^{-3})(mm^{-1})$ $TCR_{COMP}=(\Delta\rho_{Pt}*A_{Pt}+\Delta\rho_{ITO}*A_{ITO})/((\rho_{Pt,0}*A_{Pt}+\rho_{ITO,0}*A_{ITO})*\Delta T)=-21.32(ppm/° C.)$ From equation (11)

$TCR_{COMP}=(TCR_{Pt}*R_{Pt,0}+TCR_{ITO}*R_{ITO,0})/(R_{Pt,0}+R_{ITO,0})$ $TCR_{COMP}=-23.5(ppm/° C.)$ The results of the self-compensated sensor are presented below. This sensor was thermally cycled to 1200° C. The experimental data shows that the TCR of self-compensated gage was almost zero (0 ppm/° C.±20 ppm/C) over the temperature range RT-1200° C.

|  | Cycle 2 (30° C.–1200° C.) | Cycle 3 (30° C.–1200° C.) | Cycle 4 (30° C.–1200° C.) | Cycle 5 (30° C.–1200° C.) |
|---|---|---|---|---|
| TCR of Pt resistor | 1206.6 | 1179.8 | 1183.5 | 1171.4 |
| TCR of ITO resistor | −701.3 | −688.4 | −705.6 | −699.5 |
| TCR of self-compensated page | −17.0 | −24.1 | −17.1 | −10.8 |
| Calculated TCR from eq. (6) | −27.5 | −16.8 | −28.6 | −21.4 |
| Calculated TCR from eq. (11) | −29.0 | −11.8 | −30.5 | −23.5 |

The dimensions of the platinum resistor 14 were (0.6 mm×500 mm×0.8 μm thick) and the dimensions of the ITO sensor 12 placed in series with the platinum resistor were (5 mm×60 mm×4.4 μm thick). These dimensions correspond to the (width×length×thickness) of each resistor and the results in the table were obtained for these particular dimensions.

Figure 4:
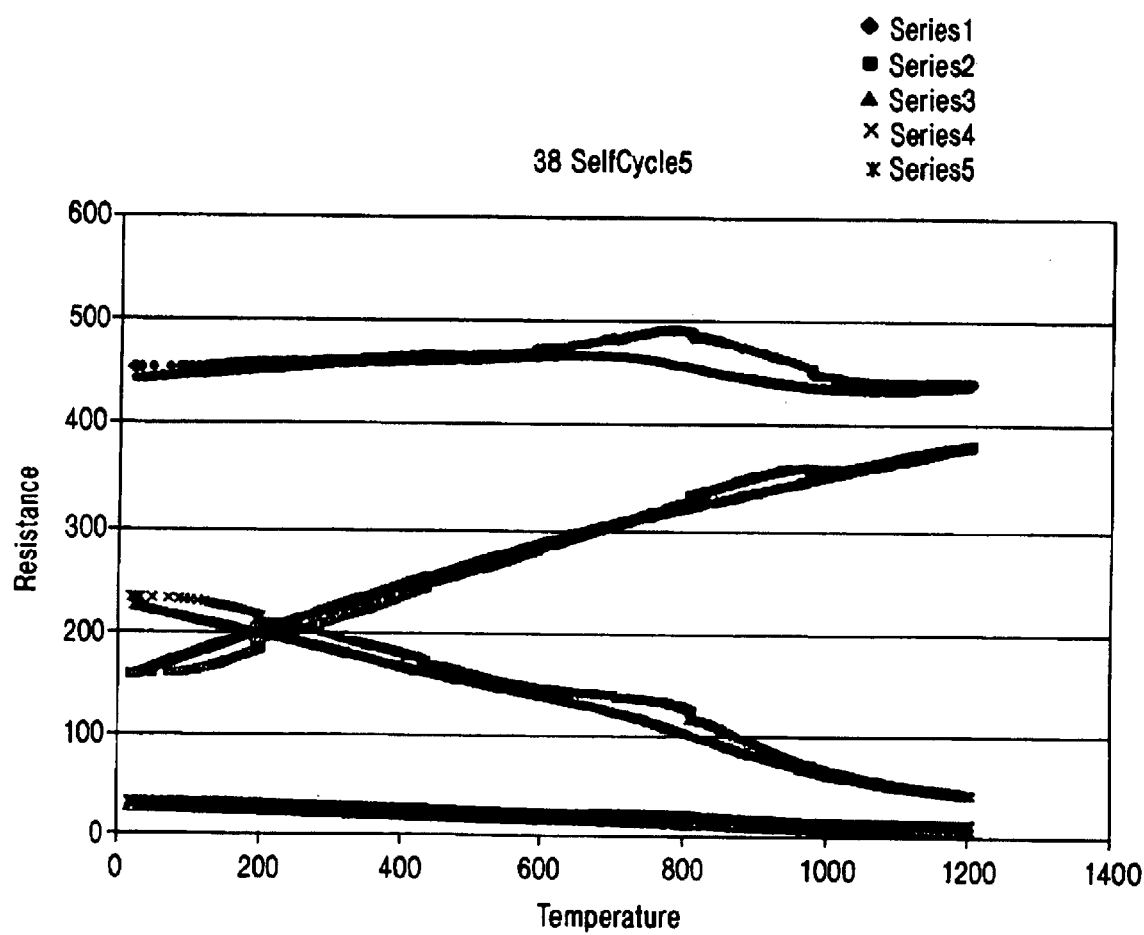
FIG. 4 is a graph of the resistance (signal) of the sensor of FIG. 1 changing with temperature.

The room temperature resistances can be read from FIG. 4, approximately 240 ohms for the ITO resistor and 160 ohms for the platinum resistor.

The use of self-compensating resistors can be used in any electrical device which requires control of a TCR as a function of temperature, i.e. thermistors, temperature sensors, RTD's, etc.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A high temperature thin film strain gage sensor which comprises:

a substrate;

an alloy film comprised of an indium oxide and a tin oxide deposited on said substrate to form an active strain element, said strain element being responsive to an applied force; and a resistor comprised of a metal film deposited on said substrate, said resistor being electrically in series with said strain element.

2. The strain gage sensor of claim 1 wherein said alloy film comprises about 90% weight $In_2O_3$ and about 10% weight $SnO_2$, all weights being based on the total weight of said alloy film.

3. The strain gage sensor of claim 1 wherein said substrate is aluminum oxide.

4. The strain gage sensor of claim 1 wherein said alloy film has a thickness of about 4 m.

5. The strain gage sensor of claim 1 wherein said metal film comprises platinum.

6. The strain gage sensor of claim 1 wherein said metal film has a thickness of about 8 μm.

* * * * *

UNITED STATES PATENT AND TRADEMARK OFFICE
CERTIFICATE OF CORRECTION

PATENT NO. : 6,729,187 B1
DATED : May 4, 2004
INVENTOR(S) : Otto J. Gregory

It is certified that error appears in the above-identified patent and that said Letters Patent is hereby corrected as shown below:

Column 6,
Line 53, please insert -- µ -- before "m".

Signed and Sealed this

Twentieth Day of July, 2004

JON W. DUDAS
*Acting Director of the United States Patent and Trademark Office*